United States Patent [19]

Hisazumi et al.

[11] Patent Number: 5,232,767
[45] Date of Patent: Aug. 3, 1993

[54] HEAT-SHRINKABLE LAMINATE FILM

[75] Inventors: Nobuyuki Hisazumi, Tsuchiura; Tsutomu Uehara; Hiroyuki Ohba, both of Ibaraki; Kazuhiko Hirose, Abiko; Yoshihiro Matsukura, Ibaraki; Kunio Shibuya, Tsuchiura, all of Japan

[73] Assignee: Kureha Kagaku Kogyo Kabushiki Kaisha, Tokyo, Japan

[21] Appl. No.: 815,874

[22] Filed: Jan. 6, 1992

Related U.S. Application Data

[63] Continuation of Ser. No. 541,974, Jun. 22, 1990, abandoned.

[30] Foreign Application Priority Data

Jun. 28, 1989 [JP] Japan ................ 1-165573

[51] Int. Cl.$^5$ ................ B32B 27/32; B32B 27/34
[52] U.S. Cl. ................ 428/213; 428/476.1; 428/476.3; 428/476.9; 428/518; 428/520; 428/910; 522/110; 522/111; 522/121
[58] Field of Search ................ 428/213, 476.1, 476.3, 428/476.9, 518, 520, 910; 522/110, 111, 121

[56] References Cited

U.S. PATENT DOCUMENTS

| | | | |
|---|---|---|---|
| 3,852,177 | 12/1974 | Atchison et al. | 204/159.17 |
| 4,547,433 | 10/1985 | Ohya et al. | 428/516 |
| 4,699,846 | 10/1987 | Ohya et al. | 428/516 |
| 4,714,638 | 12/1987 | Lustig et al. | 428/35 |
| 4,724,176 | 2/1988 | Sun | 428/35 |
| 4,724,185 | 2/1988 | Shah | 428/339 |
| 4,732,795 | 3/1988 | Ohya et al. | 428/36 |
| 4,737,391 | 4/1988 | Lustig et al. | 428/35 |
| 4,788,105 | 11/1988 | Mueller et al. | 428/412 |

FOREIGN PATENT DOCUMENTS

| | | |
|---|---|---|
| 0202814 | 11/1986 | European Pat. Off. |
| 0206894 | 12/1986 | European Pat. Off. |
| 0323122 | 7/1989 | European Pat. Off. |
| 0336680 | 10/1989 | European Pat. Off. |
| 54-129047 | 10/1979 | Japan |
| 0208369 | 12/1983 | Japan |
| 1-281935 | 11/1989 | Japan |
| 2-022053 | 1/1990 | Japan |

*Primary Examiner*—Paul J. Thibodeau
*Assistant Examiner*—D. S. Nakarani
*Attorney, Agent, or Firm*—Nixon & Vanderhye

[57] ABSTRACT

A biaxially stretched heat-shrinkable laminated film is disclosed which possesses good heat-shrinkability, excellent melt hole resistance and heat-resistant sealing property (the heat resistance of a seal portion), and highly satisfactory cold resistance, retains transparency even after shrinkage, and serves advantageously as a wrap for packaging foodstuffs. The laminated film is provided as an oxygen barrier layer with a layer of a mixture of vinylidene chloride resin and a low melting point polyamide resin having a crystalline melting point of not higher than 210° C. This mixed resin has been cross-linked by applying the electron beam to the laminate in a dosage in the range of 1 to 12 megarads. The laminated film exhibits a heat shrinkage percentage of not less than 15% at 90° C. and excels in gas barrier property.

8 Claims, No Drawings

HEAT-SHRINKABLE LAMINATE FILM

This is a continuation of U.S. patent application Ser. No. 07/541,974, filed Jun. 22, 1990, now abandoned.

BACKGROUND OF THE INVENTION

This invention relates to a biaxially stretched heat-shrinkable laminate film which possesses good heat-shrinkability, excellent melt hole resistance (ability to resist formation of melt holes) and heat-resistant sealing property (the heat resistance of a seal portion), and outstanding cold resistance, serves satisfactorily as a packaging material suitable for wrapping food, comprises therein as an oxygen barrier layer a layer of a mixture of vinylidene chloride resin with a low melting point polyamide resin having a crystalline melting point of not higher than 210° C., has the mixed resin cross-linked by applying electron beam to the laminated film at the range of 1 to 12 megarads, exhibits a heat shrinkage percentage of not less than 15% at 90° C., and excels in the gas-barrier property.

Generally shrinkable packages are most convenient for the purpose of wrapping such fatty foodstuffs as raw meat, processed meat, and cheese which are ununiform and irregular in shape. Since these food are required to be stored for a long time, they require not only an excellent gas barrier property [less than 200 (cc/m$^2$·day·atom) under the conditions 30° C. and 100% RH] but also highly satisfactory functions such as heat sealability, cold resistance, melt hole resistance, and heat-resistance sealing property. Moreover, the transparency of the packaging material after shrinkage constitutes one of the important factors which affects the appearance of the packaged product. When a fatty foodstuff is packaged and pasteurized, it is often observed that the film softened with fat and heat is stretched to become thin and thus break (melt holes) and the stress of heat shrinkage generated during the course of pasteurization inflicts breakage along or near the sealed edge of the package. In the circumstances, the industry has required for a heat-shrinkable film having gas barrier property, melt hole resistance, heat-resistant sealing property, cold resistance which excludes the possibility of occurring pin holes and other similar flaws during a distribution in a low temperature, and retaining excellent transparency even after shrinkage.

The vinylidene chloride resin (hereinafter referred to briefly as "PVDC") film are used extensively because it excels in the first place in shrinkability and equally in gas barrier property, oil resistance, clipping property, and other qualities.

The conventional PVDC film contains 6 to 10% by weight of such additives as plasticizer and stabilizer for the impartation to itself of ample cold resistance, flexibility indispensable to the enhancement of clipping property, and highly satisfactory film-forming property. With foodstuffs of some sorts, these additives have the possibility of migration into the foodstuff and bring about effects undesirable sanitarily. Where the film is subjected to severe conditions such as are encountered in the wrapping of heavy articles, it has the possibility of betraying its deficiency in strength and particularly in cold resistance. Thus, the desirability of supplying the industry with an excellent packaging material free from such drawbacks has been finding enthusiastic recognition.

For the purpose of eliminating these drawbacks, there has been proposed a three-layer film which is produced by coextruding an intermediate layer of PVDC containing such additives as plasticizer and stabilizer in very small or virtually negligible amounts and a pair of outer layers of ethylene-vinyl acetate copolymer (EVA) excelling in cold resistance and adhesion to the PVDC layer and which, consequently, overcomes the hygienic problem of the PVDC film and enjoys improved cold resistance (Canadian Patent No. 982,923).

Further, a laminate which comprises sequentially (1) a first layer containing an organic polymer (2) a gas barrier layer based on PVDC and allowed to endow the laminate with an oxygen permeation rate of not more than 70 cc/m$^2$/day/atm (as measured under the conditions of 22.8° C. and 0% RH in accordance with ASTM 1434), and (3) a layer containing an organic polymer capable of withstanding severe handling and owns flexibility suitable for a heat-shrinkable package and which is characterized by the fact that the layer 1 contains an oriented copolymer of ethylene and vinyl acetate containing 5 to 20% by weight of a unit originating in vinyl acetate and the copolymer is cross-linked by exposure to radiation, the gas barrier layer 2 contains 70 to 85% by weight of a unit originating in vinylidene chloride and 30 to 15% by weight of a unit originating in vinyl chloride, and the layer 3 contains (i) a copolymer of ethylene and vinyl acetate containing 5 to 20% by weight of a unit originating in vinyl acetate or (ii) a blend of isotactic polypropylene, atactic polypropylene, and polybutene-1 (Japanese Patent Publication No. 43024/1983, U.S. Pat. No. 3,741,253); a laminate which comprises at least three layers, including a gas barrier resin layer, a layer of a different thermoplastic resin, and an adhesive layer interposed therebetween and which is characterized by the fact that the adhesive layer is formed of a composition consisting of 100 parts by weight of a melt-extrudable adhesive resin and 0.1 to 50 parts by weight of a radiation-sensitive compound and is cross-linked by exposure to radiation (Japanese Patent Laid-open No. 11,342/1985, U.S. Pat. No. 4,699,846); a stretched film laminate which comprises (1) a substratal film layer containing an alpha-monoolefin polymer cross-linked by exposure to radiation and (2) a film layer containing a polymer cross-linkable by exposure to radiation and which, by exposure of itself to radiation, causes the polymer of the film (2) to be cross-linked and the polymer of the substratal film (1) layer further cross-linked (Japanese Patent Publication No. 47, 859/1986); a heat-shrinkable biaxially stretched multilayer film which includes a gas barrier layer containing a vinylidene chloride-methyl acrylate copolymer and which is exposed to radiation of a dosage level approximately in the range of 1 to 5 megarads, and suitable for wrapping slices of primal, subprimal meats (Japanese Patent Laid-open No. 3948/1987); and a molecular oriented multilayer polymer film which comprises a first layer and a second layer each formed of a composition containing an ethylene-vinyl acetate copolymer in a predominant proportion and a third layer formed of a composition of PVDC and interposed between the first and second layers and which has the first, second, and third layers joined by cross-linking bondage due to exposure to electron beam in a dosage of not less than 1.5 megarads (Japanese Patent Laid-open No. 23,752/1987) have been proposed to the art.

Besides, laminated films incorporating as outer layer therein a polyolefin layer or an EVA layer cross-linked by exposure to radiation have been proposed by Japanese Patent Laid-open No. 3,456/1972, Japanese Patent Publication No. 20,549/1979, U.S. Pat. No. 4,044,187, U.S. Pat. No. 4,064,296, U.S. Pat. No. 4,352,844, U.S. Pat. No. 4,501,780, Japanese Patent Publication No. 5553/1968, Japanese Patent Publication No. 20599/1971, Japanese Patent Publication No. 44,019/1976 and, Japanese Patent Publication No. 44,020/1976, British Patent No. 2,040,804, U.S. Pat. No. 4,391,862, U.S. Pat. No. 4,448,792, U.S. Pat. No. 4,514,465, and U.S. Pat. No. 4,551,380, etc.

Though the conventional laminated films such as, for example, the film of the multilayer construction of EVA/PVDC/EVA possess heat-sealability, good cold resistance and excellent gas barrier property and make up for the drawbacks suffered by the film formed solely of PVDC, they are deficient in melt hole resistance and heat-resistant sealing property.

For the purpose of improving these conventional laminate films in heat resistance, the cross-linking technique relying on the exposure to radiation as disclosed in the aforementioned patent publications has been introduced to the art. The crystallized PVDC is a copolymer of the type which, on exposure to electron beam, undergoes degradation attended by molecular scission. When a laminate incorporating therein a layer of crystallized PVDC is exposed to electron beam, therefore, it suffers impairment caused by the $_{poor\ cold}$ resistance.

For the purpose of imparting heat shrinkability to the laminate having a pair of polyolefin layers opposed to each other across an intervening PVDC layer, the practice of stretching the laminate at a temperature not more than 40° C. lower than the crystalline melting point of the polyolefin is generally employed. This stretching, therefore, is incapable of imparting a fully satisfactory effect of orientation to the PVDC layer of the laminate. Since the PVDC layer is consequently deficient in heat shrinkage percentage, it is left behind in the behavior of shrinkage when the laminate is subjected to heat shrinkage. As the result, the PVDC layer bends limply and tends to impair seriously the transparency of the laminate after shrinkage.

In the field of food packaging, therefore, an earnest demand is expressed for a heat-shrinkable film which possesses not only satisfactory gas barrier property and high cold resistance but also outstanding melt hole resistance and heat-resistant sealing property and, at the same time, retains excellent transparency even after shrinkage.

After a diligent study aimed at overcoming the aforementioned drawbacks suffered by the conventional techniques, the present inventors have found that when a laminate incorporating therein as a gas barrier layer a layer of a mixture of 5 to 50% by weight of PVDC and 95 to 50% by weight of a low melting point polyamide resin is exposed to electron beam at a dosage in the range of 1 to 12 megarads, since the mixed resin is cross-linked, the layer of the mixed resin can be endowed with heat-shrinkability by a subsequent step of stretching and the laminate can be vested with low-temperature impact strength and gas barrier property. It has been further found that, in this case, it is desirable from the standpoint of protecting the laminate against coloration after exposure to the electron beam and, at the same time, enhancing the degree of cross-linking that the PVDC should incorporate therein a cross-linking agent and should be then blended with the low melting point polyamide resin. The present invention has been accomplished on the basis of this knowledge.

SUMMARY OF THE INVENTION

An object of the present invention is to provide a biaxially stretched heat-shrinkable laminated film which comprises as a barrier layer a layer formed of a mixture of PVDC and a low melting point polyamide having a crystal melting point of not higher than 210° C., said layer of mixed resin having a thickness in the range of 5 to 30% based on the total thickness of the laminated film, said mixed resin being cross-linked by applying the electron beam to the laminated film at a dosage in the range of 1 to 12 megarads, exhibits a heat shrinkage percentage of not less than 15%, and excels in gas barrier property or a heat-shrinkable laminated film which has contained in the layer of the mixed resin 0.5 to 9% by weight, based on the amount of PVDC, of a polyfunctional (meth)acrylate.

Another object of this invention is to provide a heat-shrinkable laminated film of the description given above, wherein one of the component layers is a polyolefin layer containing as a cross-linking agent 0.5 to 7.5% by weight of an α,ω-alkyl di(meth)acrylate and the polyolefin layer is also cross-linked by applying the electron beam to the laminated film at a dosage in the range of 1 to 12 megarads.

The term "(meth)acrylate" as used herein refers selectively to acrylate or methacrylate.

A further object of this invention is to provide a heat-shrinkable laminated film which comprises an outer layer and an inner layer both of a polyolefin, an intermediate layer formed of a mixture of PVDC containing 0.5 to 9% by weight, based on the amount of PVDC, of a polyfunctional (meth)acrylate with a low melting point polyamide having a crystalline melting point of not higher than 210° C., and adhesive layers each formed of adhesive resin and respectively disposed between said layers and which has the intermediate layer cross-linked by applying the electron beam to the laminate at a dosage in the range of 1 to 12 megarads.

Yet another object of the present invention is to provide a heat-shrinkable laminated film which comprises an inner layer of a polyolefin, an outer layer of a polyolefin containing 0.5 to 7.5% by weight of an α,ω-alkyl di(meth)acrylate as a cross-linking agent, an intermediate layer formed of a mixture of PVDC and a low melting point polyamide having a crystalline melting point of not higher than 210° C. and additionally containing 0.5 to 9% by weight of a polyfunctional (meth)acrylate, and adhesive layers each formed of adhesive resin and respectively disposed between the layers and which has the intermediate layer and the outer layer cross-linked by applying the electron beam to the laminate at a dosage in the range of 1 to 12 megarads.

By the adoption of the layer construction contemplated by the present invention, there can be obtained a heat-shrinkable laminated film which excels in gas barrier property, melt-hole resistance, heat-resistant sealing property, cold resistance, and transparency and manifests these qualities in a balanced state.

DETAILED DESCRIPTION OF THE INVENTION

The mixed resin which is used in the present invention is a mixture of PVDC with a low melting point polyamide resin having a crystalline melting point of not higher than 210° C.

The term "PVDC" as used herein refers to a copolymer of vinylidene chloride as a main component with a monomer copolymerizable therewith. It is desired to have a vinylidene chloride content in the range of 65 to 95% by weight. If the vinylidene chloride content is less than 65% by weight, the PVDC lacks practicability because it shows a rubbery state at room temperature, fails to exhibit crystallinity, and offers extremely poor gas barrier property. If the vinylidene chloride content exceeds 95% by weight, the PVDC shows an unduly high melting point, tends to undergo ready thermal decomposition, and allows stable melt extrusion only with difficulty. The monomers which are copolymerizable with vinylidene chloride include vinyl chloride, acrylonitrile, acrylic acid, methacrylic acid, alkyl esters of acrylic acid containing alkyl groups of 1 to 18 carbon atoms, alkyl esters of methacrylic acid containing alkyl groups of 1 to 18 carbon atoms, maleic anhydride, maleic acid, alkyl esters of maleic acid, itaconic acid, alkyl esters of itaconic acid, vinyl acetate, ethylene, propylene, isobutylene, butadiene and other similar unsaturated monomers, for example. One member or a combination of two or more members selected from the group of monomers mentioned above is used for the copolymerization.

The present invention imposes no particular restriction on the plasticizer to be used. Any of the low molecular plasticizers and high molecular plasticizers known to the art can be used. It is also allowable to use any of the stabilizers known to the art as occasion demands.

The plasticizers which are usable herein include aliphatic dibasic esters such as dioctyl adipate, dioctyl sebacate, and dibutyl sebacate, hydroxy polycarboxylates such as tributyl citrate and tributyl acetylcitrate, glycerin esters, polyester type plasticizers, epoxidized vegetable oils, epoxidized octyl stearate, and isopropylidene-diphenol-epichlorohydrin condensate, for example. Such a plasticizer may be used to improve the extrusion properties of the film.

The amount of the plasticizer is desired to be in the range of 0.1 to 3% by weight, based on the amount of PVDC. The effect of the added plasticizer is not manifested if the amount of this addition is less than 0.1% by weight. The gas barrier property will deteriorate, resulting in a failure to achieve the objects of the present invention if this amount exceeds 3% by weight.

Commercially available heat stabilizers are usable. It is particularly desirable to use an epoxy type stabilizer. The term "epoxy type stabilizer" as used herein refers to a compound which possesses an epoxy group which is a three-member ring of carbon, carbon and oxygen in the molecular unit thereof. It functions as an agent for capturing the hydrogen chloride which is generated by the thermal decomposition of PVDC. It is incorporated for the purpose of preventing PVDC from deterioration. To be specific, the epoxy type stabilizers which are usable herein include epoxidized vegetable oils such as soybean oil, safflower oil, sunflower oil, linseed oil, and cottonseed oil, epoxidized fatty acid monoesters represented by epoxidized octyl stearate, epoxidized fatty acid diesters obtained by epoxidizing glycol esters of unsaturated fatty acids, and alicyclic epoxides represented by epoxyhexahydrophthalic acid ester, for example.

As the polyamide resin to be mixed with PVDC, a low melting point polyamide resin having a crystalline melting point of not higher than 210° C., preferably not higher than 180° C., is used. In the present invention, the crystalline melting point of polyamide resin is measured in accordance with ASTM-D648. As the low melting point polyamide resin, at least one member selected from the group consisting of aliphatic ($C_4$ to $C_{12}$) polyamides, alicyclic polyamides, and aromatic polyamides is used. The component monomers of such polyamides which are advantageously usable herein include linear ω-aminocarboxylic acids of 6 to 12 carbon atoms and lactams thereof, adipic acid, sebacic acid, dodecanedicarboxylic acid, heptadecanedicarboxylic acid, hexamethylene diamine, isophthalic acid, bis-(4-aminocyclohexyl)-methane, 2,2-bis-(4'-aminocyclohexyl)-propane, terephthalic acid and dimethyl esters thereof, 1,6-diamino-2,2,4-trimethyl hexane, 1,6-diamino-2,4,4-trimethyl hexane, and 1-amino-3-aminomethyl-3,5,5-trimethyl-cyclohexane, for example. The polymers and copolymer which are formed from these component monomers are used in the present invention. Among polyamides mentioned above, nylon 6-66, nylon 6-69, nylon 6-11, nylon 12, nylon 6-12, nylon 6-66-610, and nylon 6-66-610-612 are particularly preferable.

The mixed resin consisting of a polyamide resin possessing a crystalline melting point exceeding 210° C. and PVDC requires an unduly high molding temperature during the operation of melt extrusion, causing the decomposition of PVDC and the molding itself will be carried out with difficulty.

The mixing ratio of PVDC and the low melting point polyamide resin is such that the proportion of PVDC is in the range of 5 to 50% by weight, preferably 20 to 45% by weight and the proportion of the low melting point polyamide is in the range of 95 to 50% by weight, preferably 80 to 55% by weight. If the proportion of PVDC is less than 5% by weight, the oxygen gas permeability and the humidity permeability are unduly large and the gas barrier property is poor so that the laminated film allows long preservation of food with difficulty. If this proportion exceeds 50% by weight, the low temperature impact strength is inferior and the laminated film tends to cause pinholes while it is preserving a foodstuff for refrigeration (below 5° C.) or freezing (below 0° C.) and does not fit practical use. The oxygen gas permeability is desired to be not more than 200 cc/m$^2$·day·atm, preferably to be in the range of 0.01 to 200 cc/m$^2$·day·atm.

In the present invention, it is desirable to use a cross-linking agent for the purpose of facilitating the cross-linking by exposure to electron beam. As the cross-linking agent, there is used a compound of the type such that when this compound is exposed to the electron beam, two or more carbon double bonds of the compound are excited to generate radicals and these radicals are linked to the radicals formed in the irradiated polyolefin or irradiated mixed resin to give rise to cross-linking points. Through the presence of these cross-linking points, a cross-linked structure can be easily formed in the irradiated polyolefin or the irradiated mixed resin.

For the purpose of providing the layer of the mixed resin with a cross-linked structure, the mixed resin using PVDC containing at least one species of polyfunctional (meth)acrylate is melted, kneaded, and coextruded into a laminate by the conventional method and the produced laminate is exposed to the electron beam in order for the laminate to acquire a cross-linked structure.

The expression "cross-linked" as used in the present invention refers, as described specifically hereinafter, to the state of a cross-linked copolymer whose gel fraction (%) as the index of cross-linking is not less than 20%.

The polyfunctional (meth)acrylate, a cross-linking agent for the production of a layer of a mixed resin possessing a cross-linked structure contemplated by the present invention, is desired to be a compound represented by the following formula:

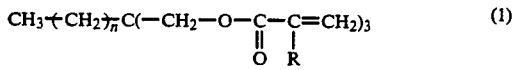

(wherein R stands for H or $CH_3$ and n representing the number of carbon atoms of methylene in trimethylol alkane tri(meth)acrylate, is an integer in the range of 0 to 4, preferably 0 to 2) or a compound of the following formula

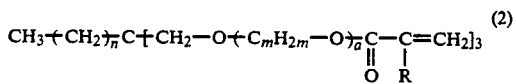

(wherein R stands for H or $CH_3$, n representing the number of carbon atoms of methylene in trimethylol alkanealkoxide (meth)acrylate is an integer in the range of 0 to 4, preferably 0 to 2, m representing the number of carbon atoms of alkoxide is an integer in the range of 1 to 3, and a is an integer in the range of 1 to 3).

If n, the number of carbon atoms of methylene in the polyfunctional (meth)acrylate represented by the formula (1) is not less than 5, there ensues the disadvantage that the polyfunctional (meth)acrylate exhibits poor compatibility with the mixed resin and the gel fraction (%) as the index of cross-linking is unduly small.

Concrete examples of the polyfunctional (meth)acrylate represented by the formula (1) are trimethylol propane trimethacrylate (TMPTMA), trimethylol propane triacrylate, and trimethylol pentane trimethacrylate.

If n, the number of carbon atoms of methylene in the polyfunctional (meth)acrylate represented by the formula (2), is not less than 5, there ensues the disadvantage that the polyfunctional (meth)acrylate exhibits poor compatibility with the mixed resin and the gel fraction (%) is unduly small. If m, the number of carbons of alkoxide, is not less than 4, there rises the disadvantage that the gel fraction (%) is unduly small. If a, the number of directly linked alkoxides, is not less than 4, there is the disadvantage that the gel fraction (%) is unduly small.

Concrete examples of the polyfunctional (meth)acrylate represented by the formula (2) are trimethylol propane propoxide trimethacrylate (TMPPOTMA), trimethylol propane propoxide triacrylate, trimethylol propane dipropoxide trimethacrylate (TMP 2POTMA), trimethylol propane tripropoxide trimethacrylate, (TMP 3POTMA), trimethylol pentane propoxide trimethacrylate, trimethylol propane ethoxide trimethacrylate, and trimethylol propane butoxide trimethacrylate.

Such a polyfunctional (meth)acrylate is added to the mixed resin in an amount of preferably 0.5 to 9% by weight, more preferably 2 to 6% by weight, based on the amount of PVDC in the mixed resin. If this amount of the polyfunctional (meth)acrylate is less than 0.5% by weight, there ensues the disadvantage that the gel fraction (%) is unduly small. Conversely, if this amount exceeds 9% by weight, there arises the disadvantage that the extrusion molding property is impaired as evinced by variation in the amount of the resin discharged during the extrusion molding. The addition of the cross-linking agent increases the degree of cross-linking of the mixed resin layer and, at the same time, prevents the coloration due to degradation.

The gel fraction (%) as the index of cross-linking is desired to be in the range of 20 to 80%, preferably 30 to 80%. If the gel fraction is less than 20%, the effect in improving the melt hole resistance is not sufficient. For the purpose of precluding the occurrence of thermal polymerization during the process of extrusion molding, the mixed resin may incorporate a polymerization inhibitor such as, for example, hydroquinone monomethyl ether (HQME) in an amount of about 500 ppm.

The thickness of the layer of the mixed resin is in the range of 5 to 30%, preferably 10 to 30%, based on the thickness of the laminated film. If the thickness of the layer of the mixed resin is less than 5% of the thickness of the laminated film, there ensues the disadvantage that the oxygen gas permeability of the laminate exceeds 200 $cc/m^2 \cdot day \cdot atm$ and, at the same time, PVDC tends to undergo decomposition during the process of the extrusion molding. If the thickness of the layer of the mixed resin exceeds 30% of the thickness of the laminated film, there arises the disadvantage that the laminate is deficient in transparency and the value of haze tends to exceed 20%. The total thickness of the laminate is in the range of 30 to 120 μm, preferably 30 to 100 μm.

The PVDC is desired to be in an amorphous state before applying the electron beam to the laminated film. If the PVDC is suffered to undergo crystallization before it is exposed to the electron beam, the biaxially stretched laminate suffers coloration due to PVDC and, at the same time, sacrifices the oxygen barrier property.

In the present invention, since the intermediate layer is formed of a mixture of PVDC and a polyamide resin and the degree of crystallization of PVDC cannot be directly determined, this invention adopt such conditions that the degree of crystallization of the film formed solely of PVDC is not more than 5% prior to the exposure to the electron beam.

The term "degree of crystallization of PVDC" as used herein refers to the magnitude which is determined as follows.

The density d ($g/cm^3$) of a sample is measured by gradient tube density determination using as a gravity solution an aqueous zinc chloride solution at 23° C. in accordance with JIS K7112.

Density of crystal phase of PVDC:

$$dc = 1.95 \ (g/cm^3)$$

(from Polymer Handbook)

The density da of an amorphous phase of PVDC is measured by using as a gravity solution an aqueous zinc chloride solution at 5° C. so that the sample does not crystallize while cooling it with the liquid nitrogen after melting of it for at least 2 minutes at 180° C.

The degree of crystallization is calculated by the following equation:

$$\frac{d - da}{dc - da} \times 100$$

The tube of molten mixture extruded from the die is quenched with cold water kept below 30° C., preferably below 20° C.

By the treatment of quenching, the PVDC is made to an amorphous state (degree of crystallization is not more than 5% by weight). When the PVDC kept in the state allowing the degree of crystallization to exceed 5% by weight is exposed to the electron beam and biaxially stretched, there ensues the disadvantage that the produced laminate assumes a color originating in PVDC, betrays a serious deterioration of oxygen gas barrier property, and suffers the oxygen permeability to exceed 200 cc/m²·day·atm (30° C. 100% RH).

The adhesive polymers which are usable herein for the adhesive layer include derivatives of α-olefin polymers such as polymers obtained by the graft addition of unsaturated carboxylic acids or anhydrides to polyethylene or polypropylene and salts thereof, α-olefin-vinyl acetate copolymers and derivatives thereof, α-olefin-unsaturated carboxylic acid copolymers and derivatives thereof such as ethylene-(meth)acrylic acid copolymer, ethylene-alkyl (meth)acrylate copolymers, and polymers obtained by grafting unsaturated carboxylic acids or anhydrides to various polymers mentioned above and salts thereof, for example. As unsaturated carboxylic acids or anhydrides which are usable for the graft polymerization, acrylic acid, methacrylic acid, maleic acid, maleic anhydride, etc. are used. The amount of such an unsaturated carboxylic acid or anhydride to be used is desired to be in the range of 0.01 to 5% by weight, based on the amount of the polymer as the mother compound. As particularly desirable adhesive polymers, ethylene-ethyl acrylate copolymers (EEA) having an ethyl acrylate content in the range of 5 to 25% by weight or ethylene-vinyl acetate copolymers having a vinyl acetate content in the range of 5 to 25% by weight, both having maleic anhydride grafted in a ratio in the range of 0.05 to 0.5% by weight, may be cited.

The polyolefins which are usable herein for the outer layer or the inner layer include high-density polyethylene (HDPE), medium-density polyethylene (MDPE), low-density polyethylene (LDPE), polypropylene (PP), ethylene-vinyl acetate copolymers (EVA) having a vinyl acetate content in the range of 5 to 20% by weight, ethylene-ethyl acrylate copolymers (EEA) having an ethyl acrylate content in the range of 5 to 20% by weight, ethylene-propylene copolymers (ET-PP) having an ethylene content in the range of 2 to 7% by weight, ethylenemethacrylic acid copolymers (EMAAC) having a methacrylic acid content in the range of 5 to 20% by weight, ethylene-acrylic acid copolymers (EAAC) having an acrylic acid content in the range of 5 to 20% by weight, linear low-density polyethylenes or ethylene-($C_4$ to $C_{12}$) α-olefin copymers (LLDPE), very low-density polyethylene (VLDPE) such as a product of Sumitomo Chemical Co., Ltd. having a density ($\rho$) of 0.9 and a melt index (MI) of 2 and marketed under trademark designation of "Excelen VL 200," and ionomers, for example. Among other polyolefins mentioned above, LDPE, EVA, EEA, ET-PP, EMAAC, LLDPE, VLDPE, and mixtures of two or more of such polyolefins are particularly desirable.

The polyolefin layer endowed with a cross-linked structure is produced by adding an α,ω-alkyl di(meth)acrylate as a cross-linking agent to the polyolefin, melting, kneading, and coextruding the resultant mixture by the conventional method thereby preparing a laminate, and applying the electron beam to the laminate.

The α,ω-alkyl di(meth)acrylate as a cross-linking agent for the production of the polyolefin of this invention possessing the cross-linked structure is a compound represented by the formula:

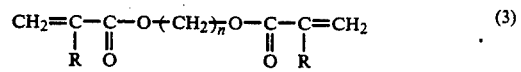

(wherein R stands for H or $CH_3$ and n for an integer in the range of 10 to 36, preferably 14 to 36). If the number of carbon atoms of alkyl is not more than 9, there arises the disadvantage that the cross-linking agent is deficient in combatibility with the polyolefin and the cross-linking agents significantly separate out immediately after melt extrusion. If the number of carbon atoms of alkyl exceeds 37, there is the disadvantage that the cross-linking agent readily solidifies at room temperature and the efficiency of the work of mixing the agent with the polyolefin is poor. Concrete examples of the α,ω-alkyl di(meth)acrylate represented by the formula (3) include α,ω-n-decanyl diacrylate, α,ω-n-tetradecanyl dimethacrylate, α,ω-n-octadecanyl diacrylate, α,ω-n-octacosanyl dimethacrylate, and α,ω-n-hexatriacosanyl diacrylate.

As a particularly preferable cross-linking agent, α,ω-n-octadecanyl diacrylate may be cited.

When such a cross-linking agent is used, it is desired to be added to the polyolefin in such an amount that its content is in the range of 0.5 to 7.5% by weight, based on the amount of the polyolefin. If the amount exceeds 7.5% by weight, there is the disadvantage that the efficiency of the extrusion molding process is deteriorated as evinced by variation in the amount of the resin extruded during the course of the extrusion molding.

By adding the cross-linking agent to the polyolefin in such an amount that its eventual amount in the polyolefin exceeds 0.5% by weight, the polyolefin is crosslinked and given an increased gel fraction (%) after exposure to the electron beam. As the result, the melt hole resistance and the heat-resistant sealing property of the produced laminate can be improved.

The gel fraction (%) of the polyolefin is desired to be in the range of 20 to 80%, preferably 30 to 80%.

Optionally for the prevention of thermal polymerization during the course of extrusion molding, a polymerization inhibitor such as, for example, hydroquinone monomethyl ether may be added in an amount of about 500 ppm.

The heat-shrinkable laminated film of the present invention is a laminate incorporating as a barrier layer a layer of a mixture of PVDC and a low melting point polyamide resin and having the mixed resin cross-linked by the applying the electron beam to the laminate at a dosage of 1 to 12 megarads. The present invention does not particularly discriminate the laminate on account of the number of component layers thereof. Besides the adhesive layer, the laminate may include layers formed of a thermoplastic resin. The thermoplastic resin is desired to be a polyolefin.

The laminates of a desired layer structure for the present invention include (i) a laminate which comprises an outer layer and an inner layer both formed of a polyolefin, an intermediate layer formed of a mixture of PVDC and a low melting point polyamide resin, and adhesive layers interposed between the adjacent component layers mentioned above, (ii) a laminate which comprises the same component layers as the laminate of (i) excepting the intermediate layer uses PVDC containing polyfunctional (meth)acrylate, (iii) a laminate which comprises the same component layers as the laminate of (ii) excepting the outer layer is formed of a polyolefin containing 0.5 to 7.5% by weight of an α,ω-alkyl di(meth)acrylate as a cross-linking agent, and (iv) a laminate which comprises a layer of a mixture of PVDC containing a polyfunctional (meth)acrylate and a low melting point polyamide resin and a polyolefin layer containing 0.5 to 7.5% by weight of an α,ω-alkyl di(meth)acrylate as a cross-linking agent, except for the innermost layer.

In all of these laminates, the mixture of PVDC and a low melting point polyamide resin and the polyolefin containing the cross-linking agent are cross-linked by applying the electron beam to the laminate at a dosage in the range of 1 to 12 megarads. The laminate is a biaxially stretched heat-shrinkable laminated film exhibiting a heat shrinkage percentage of not less than 15% at 90° C. and excelling in the gas barrier property.

In the packaging of such fatty foodstuffs as raw meat, processed meat, and cheese which are uneven and irregular in shape, if the bag of a given film possesses a heat shrinkage percentage of not more than 15% at 90° C., there ensues the disadvantage that the film generates insufficient clinging to the content and produce the separation of meat juice which reduces the values of product.

The laminate requires to exhibit an oxygen gas permeability of not more than 200 cc/m$^2$·day·atm, preferably not more than 100 cc/m$^2$·day·atm.

If this oxygen gas permeability exceeds 200 cc/m$^2$·day·atm, there ensues the disadvantage that the produced package suffers from an unduly short shelf life.

The method for the production of the laminate of the present invention will be described below with reference to a layer combination using an inner and outer layers formed of a polyolefin and an intermediate layer (oxygen gas barrier layer) formed of a mixture of PVDC and a low melting point polyamide resin.

A resin prepared by mixing a low melting point polyamide with PVDC having, or not having, a polyfunctional (meth)acrylate dispersed therein as a cross-linking agent is used for a gas barrier layer. This mixed resin, a polyolefin containing, or not containing, a suitable amount of a cross-linking agent α,ω-alkyl di(meth)acrylate as an outer layer, a polyolefin as an inner layer, and an adhesive polymer are melted and kneaded by the conventional technique using an extrusion molding device, then the molten polymers are introduced into an annular die for lamination, and coextruded and superposed sequentially in the order of outer layer/adhesive layer/intermediate layer/adhesive layer/inner layer. The melt tubular film consequently obtained is quenched by the showering with cold water at a temperature in the range of 10° to 20° C. and then flattened as held in the amorphous state. The flattened tubular film thus obtained is introduced into an electron beam irradiating device, irradiated throughout the entire depth of laminate with the electron beam at a dosage in the range of 1 to 12 megarads, and then subjected to simultaneous biaxial stretching by the inflation method at a temperature in the range of 60° to 120° C.

The electron beams which are usable in the present invention include those possessing an energy in the range of 150 to 10,000 keV and emitted from various electron beam accelerators such as of Cockcroft-Walton type, Van de Graaff type, resonance transformer type, insulated core transformer type, linear accelerator type, Dynamitron type, and high-frequency cyclotron type, for example.

In the heat-shrinkable laminate film of the present invention, the intermediate layer, i.e. the layer of a mixture of PVDC and a low melting point polyamide resin, is biaxially stretched after the PVDC is cross-linked by the exposure to the electron beam. The intermediate layer, therefore, enjoys an improvement in the cold resistance and the melt hole resistance and exhibits a heat shrinkage percentage of not less than 15% in the longitudinal and lateral directions at 90° C. Since the intermediate layer and the outer and inner layers have mutually close heat shrinkage percentage, therefore, the intermediate layer refrains from forming any bend and the laminated film excels in transparency even after the laminated film is thermally shrunken. Thus, the laminated film has still better heat shrinkage percentage.

When the outer layer is formed of a cross-linked polyolefin, it is more improved in the melt hole resistance and the heat-resistant sealing property.

When the inner layer of a polyolefin is used as a sealing layer, since the polyolefin of the inner layer incorporates no cross-linking agent therein, it possesses a low degree of cross-linking and maintains an outstanding heat-sealing property even after the laminate is wholly exposed to the electron beam.

When the adhesive layers adjoining the opposite surfaces of the intermediate layer are formed of EEA and an acid grafted EVA, since the EEA and the acid grafted EVA have been cross-linked by applying the electron beam to the laminate at a dosage in the range of 6 to 12 megarads, the adhesive layers excel in heat resistance and prevents the lamination from the adverse phenomenon of delamination while the laminated film is held in boiling water.

Now, the present invention will be described more specifically with reference to examples. It should be noted, however, that this invention is not limited to these examples.

Example 1

Intermediate layer as a barrier layer

A resin composition obtained by using a 6-66-610 nylon copolymer resin having a crystalline melting point of 140° C. (produced by Toray Industries, Inc. and marketed under trademark designation of "Amilan CM 4000") and a vinylidene chloride-vinyl chloride copolymer (having a vinylidene chloride content of 87% by weight) having 1% by weight of dibutyl sebacate and 2% by weight of epoxidized soybean oil dispersed therein and mixing these resin in a ratio of 60% by weight to 40% by weight.

Inner layer

An EVA (melt index 2.3 and specific gravity 0.93) having a vinyl acetate content of 7.5% by weight.

Outer layer

A resin composition using the same EVA as in the inner layer, excepting an α,ω-n-octadecanyl diacrylate is dispersed therein as a cross-linking agent in an amount of 3.5% by weight.

Adhesive layers interposed between adjacent component layers mentioned above

A polymer (melt index 2.3 and specific gravity 0.94) having maleic anhydride grafted to an EVA having a vinyl acetate content of 15% by weight.

The resins of the layers mentioned above were separately melted and extruded with four extruding devices. The extruded resins were introduced into a coextruding annular die, melted and joined mutually therein, and coextruded inside the die as five layers. At the outlet of the die, the molten resins had a temperature of 185° C. In order for keeping the PVDC in the intermediate layer to an amorphous state, the tubular film of molten resin emanating from the die was quenched by the showering with cold water at a temperature in the range of 18° to 20° C., and a flattened tubular film having 150 mm in width and 470 μm in wall thickness was obtained.

In an electron beam irradiating device using an acceleration voltage of 500 keV, the flattened tubular film was applied by the electron beam at a dosage of 6 megarads. Then, the tubular film was passed through a hot water bath kept at 90° to 95° C., cooled by the airing at 20° C. and, at the same time, stretched by the inflation method to 3 times the original size both in the longitudinal and lateral directions. The biaxially stretched film consequently obtained had a folded width of about 450 mm and a wall thickness of about 54 μm.

EXAMPLE 2

A biaxially stretched film was produced by faithfully repeating the procedure of Example 1, excepting for using the resin mixture of a 6-12 nylon copolymer resin having a melting point of 130° C. (produced by EMS-CHEMI AG and marketed under trademark designation of "Glyron CF3S") as a low melting polyamide and a vinylidene chloride-vinyl chloride copolymer (having a vinyl chloride content of 87% by weight) having 3.5% by weight of TMPTMA as a cross-linking agent, 1% by weight of dibutyl sebacate, and 2% by weight of epoxidized soybean oil disposed therein for the intermediate layer and mixing these resin in a ratio of 60% by weight and 40% by weight.

EXAMPLE 3

A biaxially stretched film was produced by faithfully following the procedure of Example 1, excepting for using a resin mixture of the same 6-12 nylon copolymer resin as used in Example 2 and a vinylidenechloride-methyl methacrylate copolymer (having a vinylidene chloride content of 94% by weight) having 3.5% by weight of TMPTMA as a cross-linking agent and 2% by weight of epoxidized soybean oil dispersed therein for the intermediate layer and mixing the resins in a ratio of 60% by weight to 40% by weight.

EXAMPLE 4

A biaxially stretched film was produced by following the procedure of Example 1, using the following component layers instead:

Inner layer

An EVA (melt index 2.3 and specific gravity 0.93) having a vinyl acetate content of 7.5% by weight.

Intermediate layer

A resin composition produced by using the same low melting polyamide used in Example 3 and a vinylidene chloride-methyl acrylate copolymer having 2% by weight of epoxidized soybean oil and 3.5% by weight of TMPTMA as a cross-linking agent dispersed therein mixed ratio is 50% by weight to 50% by weight.

Outer layer

The same EVA as that used in the inner layer and excepting that the dosage of the electron beam irradiation was changed to 10 megarads.

EXAMPLE 5

A biaxially stretched film was produced by faithfully following the procedure of Example 3, excepting the cross-linking aging used in the intermediate layer was changed to 5% by weight of TMPPOTMA and an ionomer resin having a melt index of 1.2 and a specific gravity of 0.94 (produced by Mitsui-Du Pont Chemical and marketed under trademark designation of "Himilan 1601") was used for, the inner layer.

EXAMPLE 6

Inner layer

A low-density linear polyethylene LLDPE having a melt index of 2.1 and a specific gravity of 0.92 (produced by Mitsui Petrochemical Industries, Ltd. and marketed under trademark designation of "Ultozex 2021L").

Outer-layer

A resin composition having 3.5% by weight of an α,ω-n-octadecanyl diacrylate dispersed in the same LLDPE as used in the inner layer.

Intermediate layer

The same composition as used in Example 3.
Adhesive layers interposed between adjacent component layers mentioned above.

An ethylene-ethyl acrylate copolymer (melt index 1.5 and specific gravity 0.93) having an ethyl acrylate content of 15% by weight.

These four resins were separately melted and extruded with four extruding devices. The molten resins were introduced into a coextruding annular die and coextruded into five layers in the die. The tubular film of molten resin had a temperature of 200° C. at the die outlet. To keep the PVDC in the intermediate layer to an amorphous state, the molten tubular film was quenched by the showering with cold water at a temperature in the range of 18° to 20° C. Consequently, there was obtained a flattened tubular film measuring 150 mm in flattened width and 470 μm in wall thickness.

In an electron beam irradiating device using an acceleration voltage of 500 keV, the tubular film was exposed to the electron beam in a dosage of 10 megarads. Then, it was passed through a hot water bath at 90° to 95° C. and a hot air tube at 110° C., cooled by the airing at 20° C. and simultaneously stretched by the inflation method to three times the original size both in the longitudinal and lateral directions. The biaxially stretched film consequently obtained had a folded width of about 450 mm and a wall thickness of about 53 μm.

EXAMPLE 7

A biaxially stretched film was produced by faithfully following the procedure of Example 6, excepting the following layers were used instead.

Inner layer

A very low-density linear polyethylene VLDPE having a melt index of 3.6 and a specific gravity of 0.910 (produced by Mitsui Petrochemical Industries, Ltd. and marketed under trademark designation of "Ultozex 1030F").

Outer layer

A resin composition having 3.5% by weight of α,ω-n-octadecanyl diacrylate dispersed in the same VLDPE as used in the inner layer.

EXAMPLE 8

A biaxially stretched film was produced by faithfully following the procedure of Example 6, excepting the following layers were used instead.

Inner layer

A resin produced by mixing LLDPE (produced by Mitsui Petrochemical Industries, Ltd. marketed under trademark designation of "Ultozex 2021L") and VLDPE having a melt index of 2.0 and a specific gravity of 0.90 (produced by Sumitomo Chemical Co., Ltd.) in a ratio of 70% by weight and 30% by weight.

Outer layer

A resin composition having 3.5% by weight of α,ω-n-octadecanyl diacrylate dispersed in the same mixed resin as used in the inner layer.

EXAMPLE 9

A laminated film was obtained by using the following layers, exposing the resultant laminate to the electron beam at a dosage of 10 megarads and biaxially stretching the treated laminate in the same manner as in Example 4.

Inner layer

An EVA having a melt index of 2.3 and a specific gravity of 0.93 and having a vinyl acetate content of 7.5% by weight.

Outer layer

A 6-12 nylon copolymer resin having a melting point of 130° C. (produced by EMS-CHEM AG and marketed under trademark designation of Glyron CF6S).

Intermediate layer

A resin composition produced by using a 6-12 nylon copolymer resin having a melting point of 130° C. (produced by EMS-CHEM AG and marketed under trademark designation of Glyron CF6S) and a vinylidene chloride-methyl acrylate copolymer (having a vinylidene chloride content of 94% by weight) having 3.5% by weight of TMPTMA as a cross-linking agent and 2% by weight of epoxidized soybean oil dispersed therein and mixing the resins in a ratio of 60% by weight and 40% by weight.

Adhesive layers

The same acid-modified EVA as used in Example 1.

The layer compositions of the films obtained in Examples 1 to 9 and the results of the test of the films for physical properties are collectively shown in Table 1.

Comparative Example 1

Intermediate layer

A resin composition having 1% by weight of dibutyl sebacate and 2% by weight of epoxidized soybean oil dispersed in a vinylidene chloride-vinyl chloride copolymer (having a vinylidene chloride content of 87% by weight).

Inner and outer layers

An EVA having a melt index of 2.3 and a specific gravity of 0.93 and having a vinyl acetate content of 7.5% by weight.

Adhesive layers interposed between the inner layer and the intermediate layer and between the outer layer and the intermediate layer An EVA having a melt index of 2.3 and a specific gravity of 0.94 and having a vinyl acetate content of 15% by weight.

These resins were separately extruded with four extruding devices. The molten polymers thus obtained were introduced into a coextruding annular die, melted and joined therein, and coextruded into five layers in the die. At the outlet of the die, the molten tube of film had a temperature of 185° C. To keep the PVDC in the intermediate layer to an amorphous state, the molten tubular film was quenched by the showering with cold water, at a temperature in the range of 18° to 20° C., and the thus obtained tubular film had 150 mm in flattened width and 470 μm in wall thickness.

In an electron beam irradiating device using an acceleration voltage of 500 keV, the tubular film was applied by the electron beam in a dosage of 6 megarads. Then, the tubular film was passed through a hot water bath at 90° to 95° C. and then cooled by the airing at 20° C and, at the same time, simultaneously stretched by the inflation method to 3 times the original size in both the longitudinal and lateral directions. The biaxially stretched film had about 450 mm in folded width and about 54 μm in wall thickness.

Comparative Example 2

A biaxially stretched film was produced by faithfully following the procedure of Comparative Example 1, excepting a 6-12 nylon copolymer resin (produced by EMS-CHEM AG and marketed under trademark designation of Glyron CF6S) was used for the intermediate layer and a resin (melt index 2.3 and specific gravity 0.94) having maleic anhydride grafted to an EVA having a vinyl acetate content of 15% by weight was used for the adhesive layers to be disposed between the adjacent component layers.

Comparative Example 3

A biaxially stretched film was produced by following the procedure of Example 3, excepting the molten tubular film was gradually cooled by the showering at 60° C., exposed in the electron beam irradiating device using the acceleration voltage of 500 keV to the electron beam in a dosage of 12 megarads, then heated for 30 seconds in a hot water bath at 90° to 95° C. to induce crystallization of the PVDC in the intermediate layer, subsequently cooled by the airing at 20° C., and simultaneously stretched by the inflation method to 3 times the original size in both the longitudinal and lateral directions.

Comparative Example 4

A biaxially stretched film was produced by faithfully following the procedure of Example 6, excepting that the outer layer and the intermediate layer omitted use of the cross-linking agent and the flattened tubular film in the cooled state was not exposed to the electron beam.

Comparative Example 5

Biaxially stretched films of other manufacturers, comprising an inner layer of an EVA cross-linked by applying the electron beam, an intermediate layer of PVDC, and an outer layer of EVA.

Comparative Example 6

A biaxially stretched film was produced by faithfully following the procedure of Comparative Example 1, excepting that the following resins were used instead and the exposure to the electron beam was omitted:

Inner and outer layers

An EVA having a melt index of 2.3 and a specific gravity of 0.93 and having a vinyl acetate content of 7.5% by weight.

Barrier layer

A resin composition produced by using a 6-12 nylon copolymer resin having a melting point of 130° C. (produced by EMS-CHEM AG and marketed under trademark designation of Glyron CF6S) and a vinylidene chloride-vinyl chloride copolymer (vinylidene chloride content 87% by weight) having 1% by weight of butyl sebacate and 2% by weight of epoxidized soybean oil dispersed therein and mixing the resins in a ratio of 60% by weight and 40% by weight.

Adhesive layers

A resin (melt index 2.3 and specific gravity 0.94) having maleic anhydride grafted to an EVA having a vinyl acetate content of 15% by weight.

The layer compositions of the films obtained in Comparative Examples 1 to 6 and the results of the test of these films for physical properties are collectively shown in Table 2.

Table 3 shows the methods used for the determination of physical properties. The gel fraction (%) and the heat shrinkage percentage in the barrier layer indicated in the table are gel fraction and heat shrinkage percentage at 90° C. obtained of the barrier layer separated from a given biaxially stretched laminated film. The gel fraction (%) of the polyolefin layers indicated in the table are those obtained of polyolefin layer separated from a given biaxially stretched laminated film:

TABLE 1

Examples

Construction of laminated film

| Example No. | Inner layer (μm) | Adhesive layer (μm) | Intermediate layer (μm) | Adhesive layer (μm) | Outer layer (μm) | Dosage of electron beam (Mrad) |
|---|---|---|---|---|---|---|
| 1 | EVA (23) | Acid-modified EVA (2) | Ny 6/66/610 (60) VD/VC 40 (10) | Acid-modified EVA (2) | EVA* (17) | 6 |
| 2 | EVA (23) | Acid-modified EVA (2) | Ny 6/12 (60) VD/VC* (40) (10) | Acid-modified EVA (2) | EVA* (17) | 6 |
| 3 | EVA (23) | Acid-modified EVA (2) | Ny 6/12 (60) VD/MA* (40) (9) | Acid-modified EVA (2) | EVA* (17) | 6 |
| 4 | EVA (23) | Acid-modified EVA (2) | Ny 6/12 (50) VD/MA* (50) (9) | Acid-modified EVA (2) | EVA* (17) | 10 |
| 5 | Inomer (23) | Acid-modified EVA (2) | Ny 6/12 (60) VD/MA* (40) (9) | Acid-modified EVA (2) | EVA* (17) | 6 |
| 6 | LLDPE (23) | EEA (2) | Ny 6/12 (60) VD/MA* (40) (9) | EEA (2) | LLDPE* (17) | 10 |
| 7 | VLDPE (23) | EEA (2) | Ny 6/12 (60) VD/MA* (40) (9) | EEA (2) | VLDPE* (17) | 10 |
| 8 | LLDPE (70) VLDPE (30) (23) | EEA (2) | Ny 6/12 (60) VD/MA* (40) (9) | EEA (2) | LLDPE (70)* VLDPE (30) (17) | 10 |
| 9 | EVA (23) | Acid-modified EVA (2) | Ny 6/12 (60) VD/MA* (40) (10) | Acid-modified EVA (2) | Ny 6/12 (7) | 10 |

| Example No. | Properties of laminated film | | | | | Properties of intermediate layer | | Outer layer | Inner layer |
| | Melt*1 hole resistance | Cold resistance | Heat shrinkage percent L/T (%) | Haze (%) | Oxygen gas permeability (cc/m² · day · atm) | Degree of coloration of laminated film | Heat shrinkage percent L/T (%) | Gel fraction (%) | Gel fraction (%) | Gel fraction (%) |
|---|---|---|---|---|---|---|---|---|---|---|
| 1 | 0 | ⊙ | 42/48 | 18 | 90 | ⊙ | 20/25 | 45 | 62 | 40 |
| 2 | 0 | ⊙ | 43/50 | 18 | 90 | ⊙ | 35/37 | 60 | 62 | 40 |
| 3 | 0 | ⊙ | 40/47 | 16 | 60 | ⊙ | 30/33 | 60 | 62 | 40 |
| 4 | 0 | ⊙ | 42/48 | 18 | 55 | ⊙ | 35/35 | 65 | 50 | 45 |
| 5 | 0 | ⊙ | 44/50 | 16 | 60 | ⊙ | 30/30 | 60 | 62 | 80 |
| 6 | 0 | ⊙ | 25/25 | 14 | 60 | ⊙ | 30/30 | 60 | 45 | 30 |
| 7 | 0 | ⊙ | 42/45 | 16 | 60 | ⊙ | 30/30 | 80 | 48 | 35 |

TABLE 1-continued

| | | | | | | Examples | | | | |
|---|---|---|---|---|---|---|---|---|---|---|
| 8 | 0 | ○ | 36/36 | 18 | 60 | ◎ | 30/30 | 80 | 48 | 32 |
| 9 | 0 | ○ | 40/42 | 16 | 55 | ◎ | 35/35 | 65 | 10 | 45 |

Ny 6/66/610: 6-66-610 Nylon copolymer
Ny 6/12: 6-12 Nylon copolymer
VD/VC: Vinylidene chloride-vinyl chloride copolymer
VD/MA: Vinylidene chloride-methyl acrylate copolymer
*Cross-linking agent added
*[1] A number of sheet with hole in 5 sheets of the tested film is shown. Allowable limits in the case are 0.

TABLE 2

Comparative Examples

| Compara. Example No. | Construction of laminated film | | | | | |
|---|---|---|---|---|---|---|
| | Inner layer (μm) | Adhesive layer (μm) | Intermediate layer (μm) | Adhesive layer (μm) | Outer layer (μm) | Dosage of electron beam (Mrad) |
| 1 | EVA (23) | EVA (2) | PVDC (10) | EVA (2) | EVA (17) | 6 |
| 2 | EVA (23) | Acid-modified EVA (2) | Ny 6/12 (10) | Acid-modified EVA (2) | EVA (17) | 6 |
| 3 | EVA (23) | Acid-modified EVA (2) | Ny 6/12 (60) VD/MA* (40) (9) | Acid-modified EVA (2) | EVA* (17) | 12 |
| 4 | LLDPE (23) | EEA (2) | Ny 6/12 (60) VD/MA (40) (9) | EEA (2) | LLDPE (17) | 0 |
| 5 | EVA*[1] (35) | | PVDC (7) | | EVA (13) | unknown |
| 6 | EVA (23) | Acid-modified EVA (2) | Ny 6/12 (60) VD/VC (40) (10) | Acid-modified EVA (2) | EVA (17) | 0 |

| Compara. Example No. | Properties of laminated film | | | | | Properties of intermediate layer | | Outer layer |
|---|---|---|---|---|---|---|---|---|
| | Melt hole resistance | Cold resistance | Heat shrinkage percent L/T (%) | Haze (%) | Oxygen gas permeability (cc/m² · day · atm) | Degree of coloration of laminated film | Heat shrinkage percent L/T (%) | Gel fraction (%) | Gel fraction (%) |
| 1 | 5 | X | 43/48 | 25 | 50 | ◎ | 3/2 | 0 | 40 |
| 2 | 3 | ○ | 44/50 | 25 | 350 | ◎ | 15/15 | 15 | 40 |
| 3 | 0 | ○ | 36/38 | 45 | 280 | X | 27/30 | 80 | 65 |
| 4 | 2 | ○ | 25/25 | 50 | 60 | ◎ | 20/20 | 0 | 0 |
| 5 | 5 | X | 33/48 | 30 | 70 | ◎ | 4/5 | 0 | 0 |
| 6 | 5 | X | 40/38 | 74 | 90 | ◎ | 10/9 | 0 | 0 |

*Cross-linking agent added.
*[1] EB cross-linking.

TABLE 3

| Item of test | Method of determination |
|---|---|
| Heat shrinkage percent | This property was determined by taking 20 square pieces, 10 cm × 10 cm, from a given film, allowing them to stand in loose state and shrink freely in a hot water bath at 90° C. for 10 seconds, measuring their longitudinal and lateral lengths, calculating shrinkage percent from the original lengths, averaging the ten shrinkage percent, and reporting average value. |
| Melt hole resistance | A hole having an internal diameter of 20 mm and a depth of 20 mm is covered with a film which is pressed by a seal packing. After the hole has been evacuated to 10 Torr, the hole is immersed in hot water at 90° C. for 10 seconds. The number of the sheet pierced with hole when 5 sheets of film are subjected to this treatment is determined. |
| Oxygen gas permeability | Prior to test, a given film was left standing for one week in an atmosphere kept under the constant conditions of 30° C. and 100% RH. The film was then tested for permeability to oxygen with an instrument [produced by Modern Controls Inc. and marketed under trademark designation of "Mocon" OX-Train Twin (coulometric detection type)] conforming to ASTM D 3985-81 in an atmosphere kept under the constant conditions of 30° C. and 100% RH. |
| Gel fraction | (1) Gel fraction, %, of polyamide resin/PVDC composition This magnitude was determined by first keeping a sample of known weight ($W_1$) immersed for 2 hours in tetrahydrofuran (indicated at THF) solvent kept at 45° C., removing the insoluble residue from the solvent, then keeping the insoluble residue for 2 hours in metacresol solvent kept at 70° C., removing the insoluble residue, vacuum drying this insoluble residue at 40° C. for 24 hours, checking the weight ($W_2$) of dried residue, and calculating the gel fraction of the composition in accordance with the following formula. Gel fraction (%) = ($W_2/W_1$) × 100 (2) Gel fraction, %, of polyolefin This magnitude was determined by following the procedure of (1), excepting trichlorobenzene solvent kept at 135° C. was used in the place of the THF solvent kept at 45° C. and the treatment with metacresol was omitted. |
| Cold resistance | This property was determined by subjecting a given film to a treatment under simulated abuse conditions in accordance with U.S. Mil-B-131C and Fed. Test Method Std. No. 101C and measuring a change in oxygen barrier property |

TABLE 3-continued

| Item of test | Method of determination |
|---|---|
|  | due to pinholes. The treatment under the simulated abuse conditions was performed by the Gelbo Flex test, using a tubular film sample of 90 mm in diameter and 200 mm in length. The treatment consisted in giving the tubular film sample 1000 rounds each of a series of crushing, bending, and rotating operations at a rate of 40 cycles per min. with an angle of 440° (arc). Then, the tubular film sample was opened and tested for oxygen barrier property. When the sample showed practically no change in oxygen barrier property from the value found before the Gelbo Flex test, it was rated by the mark "◯". When the sample showed a deterioration by more than about 400 cc/m² · day · atm, it was rated as "X". |
| Haze (%) | This property was determined by preparing squares of 10 cm cut from a laminated film, causing the squares to stand in relaxed state in hot water bath at 90° C. for 1 minute and shrink freely. The squares were tested for haze (%) with a haze meter produced by Nihon Denshoku Kogyo K.K. and marketed under trademark designation of NDH Σ80. |
| Degree of coloration of laminated film | This property was determined by preparing squares of 10 cm cut from a laminated film, causing the squares to stand in relaxed state in boiling water for 1 minute. Then, they were evaluated as to degree of coloration on the following criteria; ⊚: No coloring is visually observed. ◯: slight coloring is observed but no problem in practical use is present. X: Extensive coloring is observed which makes it impossible to put the film into practical use. |

The biaxially stretched laminated film of the present invention is such that, as demonstrated in the examples, the polymer layer which as a core layer is formed of a blend of PVDC and a low melting polyamide resin exhibits a behavior of shrinking with heat. This biaxially stretched laminated film used as a wrap for packaging food, therefore, acquires evidently improved transparency after the produced package is treated in boiling water. The film excels in heat-resistant sealing property, melt hole resistance, and gas barrier property and possesses highly desirable cold resistance and heat-sealability and, therefore, serves ideally as a wrap for foodstuffs. The film brings about an especially satisfactory effect in precluding the occurrence of melt holes therein when the polyolefin used in the outer layer thereof is in a cross-linked state.

The laminated film of Comparative Example 1 was conspicuously deficient in melt hole resistance, cold resistance, and haze because the intermediate layer was formed solely of PVDC having no cross-linking agent therein like the outer layer.

The laminated film of Comparative Example 2 was deficient in melt hole resistance and oxygen gas barrier property because the intermediate layer was formed solely of a 6-12 nylon and the outer layer incorporating no cross-linking agent therein.

The laminated film of Comparative Example 3 was colored too conspicuously to fit practical use because the PVDC incorporated in the intermediate layer was exposed in the crystallized state to the electron beam. Further it was eventually deficient in oxygen gas barrier property and in haze after shrinkage because PVDC could not be dispersed in laminar state.

The laminated film of Comparative Example 4 was deficient in melt hole resistance because it was not exposed to the electron beam.

The commercially available laminated films used in Comparative Example 5 hardly deserved praise for melt hole resistance, cold resistance, or transparency after shrinkage.

The laminated film of Comparative Example 6 was conspicuously deficient in melt hole resistance, cold resistance, and haze because it was not exposed to the electron beam for inducing cross-linking.

We claim:

1. A biaxially stretched, heat-shrinkable laminated film having a heat shrinkage of not less than 15% at 90° C. and an oxygen permeability of not more than 200 cc/m²·day·atm under the conditions of 30° C. at 100% relative humidity, said film comprising a layer formed of a mixture of 5 to 50% by weight of a polyvinylidene chloride copolymer containing 65 to 95% vinylidene chloride monomer units, 95 to 50% by weight of a polyamide resin having a crystalline melting point of not higher than 210° C.;
a plasticizer in an amount of 0.1 to 3% by weight based on the polyvinylidene chloride copolymer, and
from 0.5 to 9% by weight, based on the amount of said polyvinylidene chloride copolymer of a polyfunctional acrylate or polyfunctional methacrylate of formula 1 to 2:

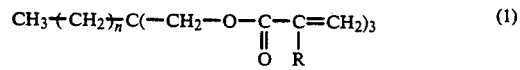

where R is H or $CH_3$ and n, the number of carbon atoms of methylene in trimethylol alkane trimethacrylate or triacrylate, is an integer in the range of 0 to 4, or

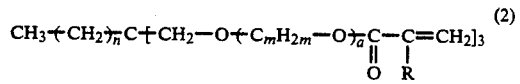

where R is H or $CH_3$, n, the number of carbon atoms of methylene in trimethylol alkane alkoxide methacrylate or acrylate, is an integer in the range of 0 to 4, m the number of carbon atoms of alkoxide is an integer in the range of 1 to 3, and a is an integer in the range of 1 to 3,
said mixed resin layer having a gel fraction as an index of cross-linking in the range of 20 to 80% and said film having been biaxially stretched after cross-linking the mixed resin layer containing polyvinylidene chloride copolymer by an electron beam at a dosage in the range of 1 to 12 megarads, said mixed resin layer having a thickness in the range of 5 to 30% of the total thickness of the laminated film.

2. A heat-shrinkable laminated film according to claim 1, wherein said polyamide is at least one member selected from the group consisting of nylon 6-66, nylon 6-69, nylon 6-11, nylon 12, nylon 6-12, nylon 6-66-610, and nylon 6-66-610-612.

3. A heat-shrinkable laminated film according to claim 1 wherein one of the layers of said laminate is a layer of a polyolefin containing 0.5 to 7.5% by weight of an α,ω-alkyl di(meth)acrylate as a cross-linking agent, said polyolefin layer being cross-linked by applying the electron beam to said laminated film at a dosage in the range of 1 to 12 megarads.

4. A heat-shrinkable laminated film according to claim 1, wherein said laminate comprises two outer layers formed of a polyolefin, an intermediate layer formed of said mixed resin layer and adhesive layers each formed of an adhesive resin and respectively disposed between said layers, said intermediate layer being cross-linked by applying the electron beam to said laminated film at a dosage in the range of 1 to 12 megarads.

5. A heat-shrinkable laminated film according to claim 4, wherein said outer layers are is formed of a polyolefin containing 0.5 to 7.5% by weight of an $\alpha,\omega$-alkyl di(meth)acrylate, said outer layer of polyolefin being cross-linked by applying the electron beam to said laminated film at a dosage in the range of 1 to 12 megarads.

6. A heat-shrinkable laminated film according to claim 3 or 4, wherein said polyolefin is at least one member selected from the group consisting of low-density polyethylene, high-density polyethylene, polypropylene, ethylene-vinly acetate copolymer, ethylene-ethyl acrylate copolymer, ethylene-propylene copolymer having an ethylene content in the range of 2 to 7% by weight, ethylene-acrylic acid copolymer having an acrylic acid content in the range of 5 to 20% by weight, ethylenemethacrylic acid copolymer having a methacrylic acid content in the range of 5 to 20% by weight, linear low-density polyethylene, and very low-density polyethylene.

7. A heat-shrinkable laminated film according to claim 3 or 4, wherein $\alpha,\omega$-alkyl dimethacrylate is a compound represented by the following formula (3):

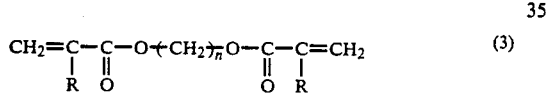

wherein R stands for H or CH$_3$, and n for an integer in the range of 10 to 36.

8. A biaxially stretched, heat-shrinkable laminated film having a heat shrinkage of not less than 15% at 90° C. and an oxygen permeability of not more than 200 cc/m$^2$·day·atm under the conditions of 30° C. at 100% relative humidity, said film comprising a layer formed of a mixture of 5 to 50% by weight of a polyvinylidene chloride copolymer containing 65 to 95% vinylidene chloride monomer units, 95 to 50% by weight of a polyamide resin having a crystalline melting point of not higher than 210° C.;

a plasticizer in an amount of 0.1 to 3% by weight based on the polyvinylidene chloride copolymer, and from 0.5 to 9% by weight, based on the amount of said polyvinylidene vinyl chloride copolymer of a polyfunctional acrylate or polyfunctional methacrylate of formula 1 or 2:

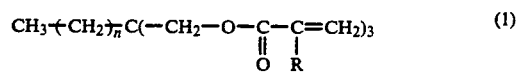

where R is H or CH$_3$ and n, the number of carbon atoms of methylene in trimethylol alkane trimethacrylate or triacrylate, is an integer in the range of 0 to 4, or

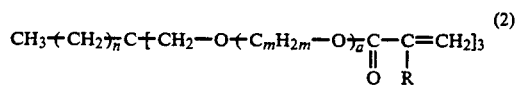

where R is H or CH$_3$, n, the number of carbon atoms of methylene in trimethylol alkane alkoxide methacrylate or acrylate, is an integer in the range of 0 to 4, m the number of carbon atoms of alkoxide is an integer in the range of 1 to 3, and a is an integer in the range of 1 to 3, said mixed resin layer having a gel fraction as an index of cross-linking in the range of 20 to 80%, said mixed resin layer having a thickness in the range of 5 to 30% of the total thickness of the laminated film, wherein the said laminated film is produced by (1) coextruding layers comprising the layer of mixed resin, (2) quenching so as to keep the vinylidene chloride resin to an amorphous state, (3) cross-linking the mixed resin by applying the electron beam to said laminated film at a dosage in the range of 1 to 12 megarads, and then (4) subjecting said cross-linked laminated film to biaxial stretching.

* * * * *